United States Patent
Brandt et al.

(10) Patent No.: US 6,700,870 B1
(45) Date of Patent: Mar. 2, 2004

(54) METHOD FOR REDUCING DATA LOSS IN AUTOMATICALLY RE-CONFIGURED ATM NETWORKS

(75) Inventors: John D. Brandt, Oldenburg, IN (US); Nicholas D. De Trana, Addison, IL (US); Arthur G. Deacon, Summit, NJ (US); Craig L. DeCaluwe, Naperville, IL (US); Hossein Eslambolchi, Basking Ridge, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/460,319

(22) Filed: Dec. 10, 1999

(51) Int. Cl.[7] .............................................. H04L 12/26
(52) U.S. Cl. ...................... 370/230; 370/235; 370/217; 370/221

(58) Field of Search ................................. 370/217, 221, 370/222, 223, 224, 225, 226, 227, 228, 357, 360, 386, 384, 395.1, 396, 397, 395.4, 395.41, 230, 235

(56) References Cited

U.S. PATENT DOCUMENTS 6,212,169 B1 * 4/2001 Bawa et al. ................. 370/252
6,496,941 B1 * 12/2002 Segal et al. ..................... 714/4

* cited by examiner

Primary Examiner—Wellington Chin
Assistant Examiner—William Schultz

(57) ABSTRACT

In an ATM network, data loss caused by pre-programmed network optimizations can be reduced or avoided if a record of such optimizations is made, and if, prior to another optimization, some event occurs. The detection of some external event should indicate that another optimization is warranted.

2 Claims, 1 Drawing Sheet

METHOD FOR REDUCING DATA LOSS IN AUTOMATICALLY RE-CONFIGURED ATM NETWORKS

FIELD OF THE INVENTION

This invention relates to asynchronous transfer mode (ATM) data networks. In particular, this invention relates to ATM data networks having so-called permanent virtual circuit (PVC) data paths that are automatically re-configured in an attempt to maximize network efficiency and capacity.

BACKGROUND OF THE INVENTION

ATM-format data and ATM networks are well known in the data and communications art. Briefly, in an ATM network, data is routed from a source to a destination over a path that is comprised of one or more ATM switches. An ATM switch receives ATM data packets on an incoming port or terminal and routes the ATM data packets out on an outgoing port or terminal. The outgoing port of one ATM switch is frequently coupled to an input port of another ATM switch. Eventually, the data is routed through the switches of an ATM network to its destination where it is to be used.

Most ATM networks include numerous ATM switches, each receiving incoming data packets and routing data to some other switch in the network. As is well known in the art, the several switches of an ATM network receive data packets that are addressed to only the next ATM switch that comprise the path over which data is sent from a source to a destination.

Virtually all ATM switches are software controlled, allowing for increased functionality, among other things. At least one feature of a software-based ATM switch is the ability to set up and tear down connections through the actual switching fabric through which data passes between a switch input port and a switch output port. The ability to specify a path through the switch enables the ATM to route data along its way to a destination.

In an ATM network, at least one type of path is a so-called permanent virtual circuit or PVC which is a path through the network that is typically set up once. Setting up a PVC requires that each of the ATM switches through which data is to be routed, be programmed to connect incoming data on a particular transmission media onto a particular outgoing data port by which the data can be delivered to its destination. Unlike a so-called switched virtual circuit or SVC by which a data path through an ATM network can change during the course of a call, a PVC is a relatively long-life path through an ATM network.

Many ATM network operators monitor the traffic loading on the PVCs in their networks so as to adjust the data paths through the network to maximize network efficiency. In fact, many ATM switches are pre-programmed to continuously optimize data capacity through the network by re-routing a customer's data from one PVC to another PVC. In some instances, the PVC over which a customer's data is carried is torn down after the data stream is routed onto another PVC. Re-routing data almost always causes at least some data loss.

Optimizing network capacity frequently requires that a data stream (the data transferred between a source and destination or the data of a particular customer of the ATM network provider) is re-routed through the network for network reliability or to maintain network capacity or for other reasons. Notwithstanding the fact that ATM switches are computer controlled and the switching software and switching hardware operates at what many consider to be blinding speed, rerouting data through PVCs in an ATM network in pursuit of network optimization almost always causes some of the data of a data stream to be lost. This also impacts system real time by requiring the system to change routes.

Data loss caused by automatic path optimization requires that the lost data be re-transmitted. To a customer of the ATM network, lost data because of automatic path optimization can appear to be a network fault. Having to needlessly re-transmit data that is needlessly lost because of automatic optimization can frustrate the customers of the ATM network service provider.

A method for controlling automatic optimization of circuits through ATM switches and networks might reduce needless data loss and actually improve customer satisfaction by reducing the number of times that a data stream is interrupted and thereby reduce the data lost that almost always accompanies a circuit or network optimization.

SUMMARY OF THE INVENTION

In an ATM switching network made up of several ATM switches through which PVCs are established, many ATM switches are programmed to automatically re-configure or re-define a PVC periodically so as to maximize system capacity or to balance the data loading on the switches and their associated links. As most ATM switches are currently designed, re-configuring a PVC in an ATM network requires that a data stream routed over one or more data links and through one or more switches be changed to run through one or more different switches in order to route the data over different links. Even when a data path switch is performed automatically, changing a data path over which a data stream is carried almost always causes a data loss, requiring data retransmission. In many instances it might be preferable to refrain from automatically re-optimizing a PVC path.

Data loss due to automatic network optimization can be minimized while maintaining network optimization by tracking the history of optimizations done on a customer's data stream and inhibiting subsequent automatic optimizations until some event has occurred. Briefly the method includes: a) tracking the history of path optimization for at least one particular data stream through a network, including identifying the PVC or data path through the network for that particular data stream at least some period of time; b) recording the occurrence of at least the most recent automatic PVC re-configuration for the data stream; c) inhibiting any subsequent (or second) automatic re-configurations of the PVC carrying the data stream through said ATM network until after the occurrence of some predetermined event, such as the passage of some length of time.

DETAILED DESCRIPTION OF THE PREFERRED EMBODIMENT

Figure 1:
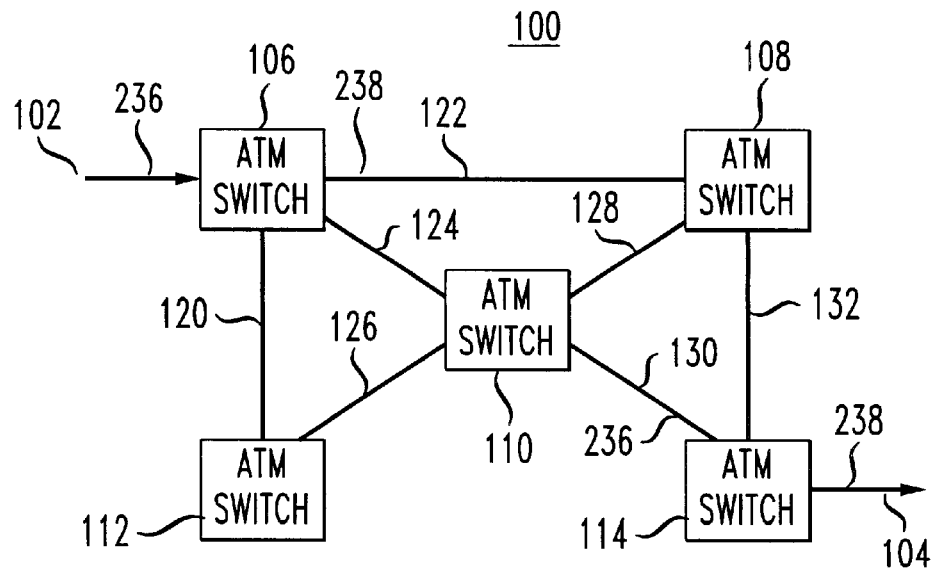
FIG. 1 shows a simplified block diagram of an ATM switching network.

FIG. 1 shows a simplified block diagram of an ATM switching network (100) comprised of several ATM switches (106, 108, 110, 112 and 114). The switches (106, 108, 110, 112 and 114) can route data from a source (102) to a destination (104) over several data conduits or physical media (120, 122, 124, 126, 128, 130 and 132) that operatively link the various switches together to form the network (100). The physical characteristics of data conduits (120, 122, 124, 126, 128, 130 and 132) are not germane to the invention but for completeness, those skilled in the art will recognize that they might be optical fiber, coaxial cable, microwave link or copper wires. While there is shown in FIG. 1 only one conduit between any two switches, actual embodiments of ATM networks typically provide several conduits between the switches so as to increase data capacity of the network (100).

A permanent virtual circuit or PVC is generally considered by those skilled in the art to be comprised of a subset of the switches (106, 108, 110, 112 and 114) pre-programmed to establish a relatively long-lived data path through the network (100) from the source (102) to the destination (104) over some subset of the several data conduits. A PVC is established by programming various switches to establish a virtual circuit through the network that remains in place through the network for at least the duration of a call or data transfer. Switched virtual circuits, or SVCs, are data paths that are more short-lived connections than PVCs. SVCs are frequently changed during the course of a data transaction.

Most ATM network providers monitor the traffic loading through the network in an effort to maximize data throughput and network reliability. If for example one conduit (124) being used to route data from a source ATM switch (106) to a destination ATM switch (114) becomes over-loaded, fails, or is suspected of being faulty, ATM switching system software in the ATM switching systems (106, 110) will frequently re-configure the network (100) in an effort to maintain system throughput and reliability. The ATM network is automatically optimized under software control. Re-configuring or optimizing the network (100) might entail re-routing data from path 124 onto path 122 for example.

Whenever a PVC through an ATM network is "optimized" data may occasionally become lost when the data being carried from the source (102) to the destination (104) is re-routed from one PVC to another. Notwithstanding the speed at which new-technology switches can be reconfigured, there are many technical reasons why at least some data of an ATM network customer may become lost due to the re-routing of from one PVC to another. When data is lost during the course of an ATM PVC re-configuration, the data transmission equipment of the customer will detect an error and will almost always resend the data.

Automatic re-optimization of data paths should be controlled to avoid data loss if data path re-configuration becomes the source of excessive data losses. Controlling automatic data path optimization can actually improve customer satisfaction without adversely affecting system reliability.

Figure 2:
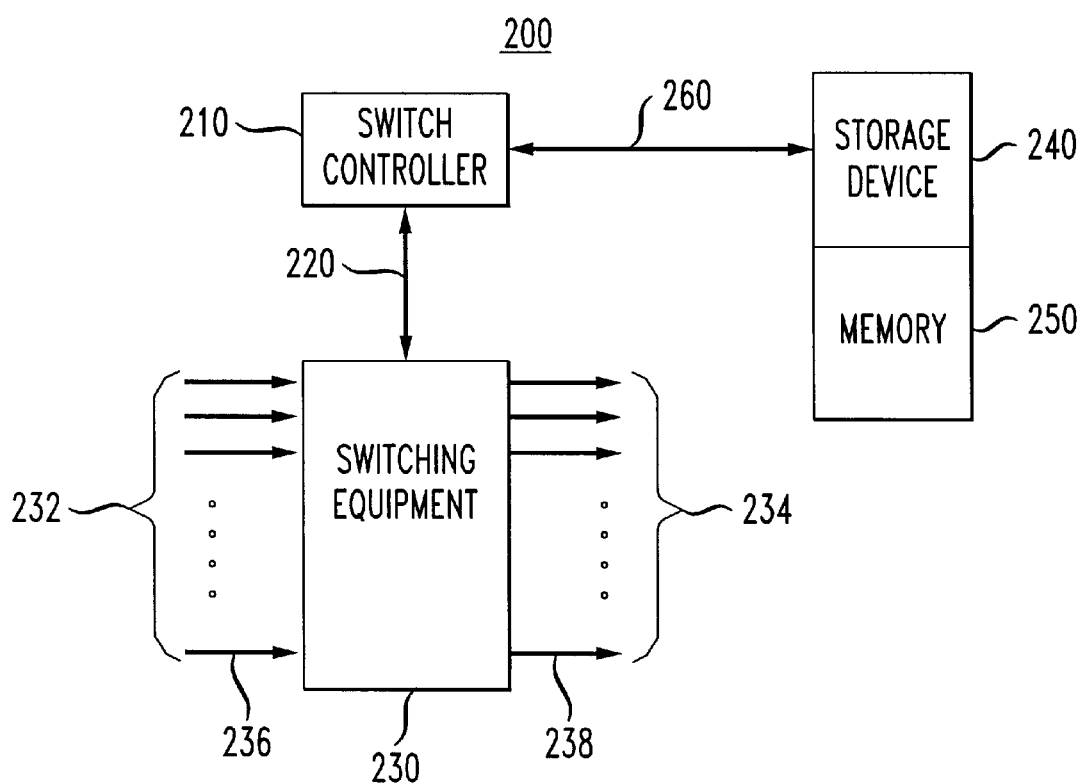
FIG. 2 shows a simplified block diagram of an ATM switch that might be used in an ATM switching network, such as that shown in FIG. 1, including a software controlled switch matrix or fabric that is automatically periodically re-configured.

FIG. 2 shows a simplified block diagram of a single ATM switch (200) that might be used in the ATM network shown in FIG. 1. In FIG. 2, an ATM switch controller (210) (typically a programmable computer) executes instructions stored in a memory device (240) (RAM, ROM, EEPROM, on disk or equivalent storage device) and records operating data elsewhere in memory (250). The instructions and data are transferred to and from the processor (210) over an appropriate bus (260).

Program instructions for the controller (210) will typically cause the controller (210) to monitor the status of the ATM switching equipment (230) that accomplishes the ATM switching function of data transferred via the ATM links 232, 234 that is required to make the switching network (100) of FIG. 1 operative. Data loss attributable to network and/or ATM link optimization and re-configuration can be avoided by limiting automatic ATM network optimization using the methodology of the invention disclosed hereinafter.

If the ATM switch controller (210) detects that one or more data streams routed from a link input (232) to a link output (234) to the switch is scheduled to be optimized, the controller (210) first determines whether or not an optimization should in fact be made, prior to executing the optimization task. The ATM controller (210) records the occurrences of automatic re-configurations and uses those records to determine if subsequent automatic re-configurations should occur or if they should be inhibited. If a link has been recently optimized, subsequent re-optimization is inhibited unless certain conditions are met. Stated alternatively, automatic optimization can be inhibited until the occurrence of some other event, such as the passage of some minimum length of time since the last optimization was performed. Other events which might be checked prior to automatic optimization include, but are not limited to, the addition or deletion of any other data path or conduit through the network (120, 122, 124, 126, 128, 130 and 132); the addition or deletion of an ATM switch to the network; the detection or correction of a fault on a data conduit or in a switch. In one embodiment of the invention, a switch (and/or its associated controller 210) through which data is passing controls the execution of the automatic re-configuration for network optimization.

In some instances, an inhibited network optimization might not be appropriate, such as when a switch or media (120, 122, 124, 126, 128, 130 and 132) fails. In such cases, a network might require optimization. In another embodiment of the invention, an ATM network service provider can manually invoke the execution of the automatic optimization software for the controller (210) from a maintenance terminal or input port to the controller (210) (not shown) in order to effect a network optimization.

By controlling automatic network optimization, which is a common feature in software controlled ATM switches and ATM networks, customer satisfaction can be improved by reducing needless data loss that is attributable to the pre-programmed and untimely network reconfigurations that are done without considering the impact that reconfiguration might have on customer data.

What is claimed is:

1. In an ATM network comprised of a plurality of ATM data routes through one or more ATM switches through which one or more PVCs can be established to route data between end points, said PVCs being automatically re-configured to optimize data flow through said ATM data routes, a method of controlling data loss to a data stream attributable to automatic re-configuration of said PVCs comprising:

a) identifying a PVC for a data stream at a first period of time;

b) recording the occurrence of an automatic PVC re-configuration for said data stream through said ATM network; and c) inhibiting a second automatic re-configuration of said PVC through said ATM network until after the occurrence of a predetermined event, wherein said predetermined event is the addition of at least one additional ATM data route through a switch of said ATM network through which said data stream passes.

2. The method of claim 1, wherein said second automatic re-configuration of said PVC through said ATM network, is controlled by said at least one additional ATM switch.

* * * * *